Figure 1:
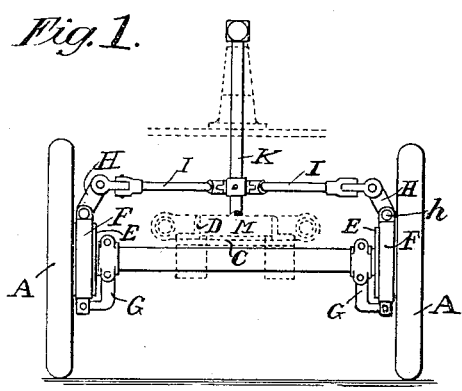

No. 663,350. Patented Dec. 4, 1900.
E. LUNDQVIST.
STEERING APPARATUS FOR VEHICLES.
(Application filed Dec. 27, 1899.)
(No Model.)

WITNESSES:
Geo. B Rowley.
John Woods.

INVENTOR
Emil Lundqvist
BY C. N. Edwards
ATTORNEY

UNITED STATES PATENT OFFICE.

EMIL LUNDQVIST, OF BERLIN, GERMANY, ASSIGNOR OF ONE-HALF TO SIGMUND BERGMANN, OF SAME PLACE.

STEERING APPARATUS FOR VEHICLES.

SPECIFICATION forming part of Letters Patent No. 663,350, dated December 4, 1900.

Application filed December 27, 1899. Serial No. 741,736. (No model.)

*To all whom it may concern:*

Be it known that I, EMIL LUNDQVIST, a subject of the King of Sweden and Norway, residing at Berlin, in the Empire of Germany, have invented certain new and useful Improvements in Steering Apparatus, of which the following is a full, clear, and exact specification.

This invention relates to steering-gear for self-propelled vehicles or automobiles, and has particular reference to that class of such vehicles or automobiles in which a change in the direction of travel is effected by turning the plane of rotation of a part of the wheels. The relative positions of the two wheels may be either fixed, as in the case of two wheels mounted on an axle, or variable, as when each wheel is separately pivoted, but made interdependent by a set of levers.

The object of the invention is to provide a simple and efficient apparatus for performing the work of changing the plane of rotation of the steering-wheels. Heretofore it has been customary for the operator to perform this work directly by the application of power through a lever and gearing; but this requires considerable force and is apt to interfere with or prevent a rapid change of direction of travel. Furthermore, any shocks caused by unevenness of the road are directly imparted to the handle. It has been proposed to overcome this by interposing reduction-gears, chains, sprockets, or similar devices; but with all such the time required for turning the axle is a serious objection.

I propose to provide means whereby the propelling force of the vehicle will be utilized to perform the work of steering and whereby such power may be applied, controlled, or thrown out of action by some simple movement of the operator's handle. I also propose to utilize parts of the steering-gear as a brake for checking the speed of the vehicle.

In carrying out my invention I propose to provide suitable devices for checking the free rotation of either one of the steering-wheels and suitably connect such devices to the operator's handle. The checking devices may consist of any of a number of well-known devices, but may most conveniently consist of a friction brake or clutch interposed between the hub of the wheel and the adjacent part of the axle. Such device will cause the wheel on which it is brought into action to turn harder, thereby unbalancing the propelling force of the vehicle on the steering-wheels, so that the axis of the dependent wheels swings around its pivots at a speed proportionately to the speed of travel and the grip of the friction-clutches. The connections between the friction-clutches and the operator's handle may comprise any suitable devices.

To throw the steering-gear out of action and maintain a given direction of travel, the operator's lever should be connected with a suitable device, ordinarily a friction-clutch, placed at the point where the steering-axis is swiveled, whereby the axis may be fixed or released at will.

When the steering device is to be used as a brake for checking the speed of the vehicle, the friction-clutches should be connected to the operator's handle in such a way that the clutches are brought into action on both wheels at the same time or on one of them when the clutch for locking the axle in fixed position is to be brought into action.

The invention will be more fully described hereinafter with reference to the forms thereof illustrated in the accompanying drawings, in which—

Figure 3:
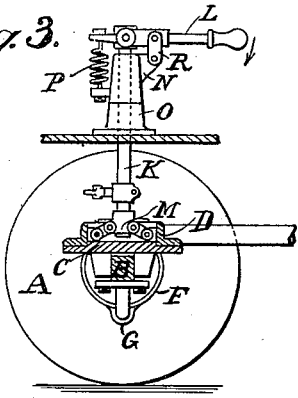
Figure 2:
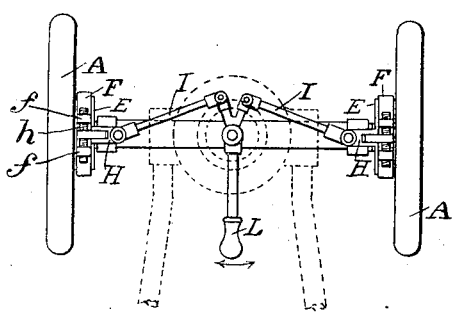
Figure 5:
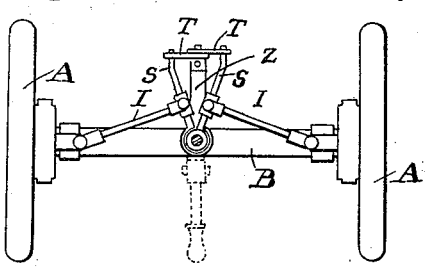
Figure 4:
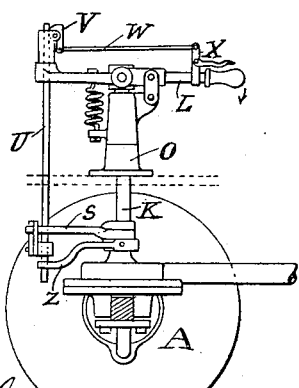
Figure 6:
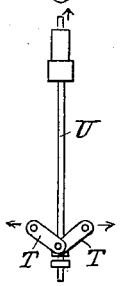

Figure 1 is a front view of the steering axle and wheels of a vehicle provided with steering-gear according to my invention, and Figs. 2 and 3 are respectively plan and sectional views of Fig. 1. Figs. 4 and 5 are respectively sectional and plan views of a modified form of steering-gear, and Fig. 6 is a detail front view of the rod U and adjacent parts.

Referring more particularly to the drawings, A A represent the two wheels of the vehicle dependently mounted, but rotating independently of each other.

B is the steering-axle, upon which the wheels are mounted.

C is a swivel-plate fastened to the axle, and D is a ring carried by the frame of the vehicle, the swivel-plate C and ring D forming together a swivel. Over the hubs of the wheels A A are placed the friction-clutches, which in this instance comprise a friction-drum E, fastened to the wheel, and the brake-strap F, surrounding the drum E and carried on the axle B by means of brackets G G, which are clamped to the axle. The friction clutches or brakes may be connected to the operator's handle in any suitable way. I prefer to connect them, as shown in the drawings, through a series of levers H and connecting-rods I I, connecting the levers H and the shaft K, the levers H H being fixed to the screw-bolts $h$, which screw into the ends $ff$ of the straps F F, and the operator's handle L being secured to the shaft K. These various details may, however, be altered in numerous ways by the substitution of any well-known equivalents for performing their respective functions.

In the construction shown in Figs. 1, 2, and 3, M is a suitable friction-clutch secured to the shaft K and to the plate C, whereby the latter may be firmly locked with the swivel-ring D. The guide-socket O is suitably mounted upon the vehicle and serves as a guide for the steering-rod K, and upon the guide-socket is swiveled a standard N, rotatable about the socket. The handle L is connected to the standard N by the link R, and the spring P serves to draw down the end of handle L, and thereby operate the clutch M to lock the swivel-ring in position whenever the operator's handle is left free, thus securing the steering-axle in any desired position.

In the operation of the apparatus above described if the vehicle is to be turned in a given direction—say, for instance, to the right—the handle L is first pressed downward against the pressure of the spring P, so as to release the clutch M, and then the handle is moved toward the right, which pulls the right-hand rod I and applies the clutch on the right-hand wheel, which retards the revolution of said wheel. The left-hand wheel, however, being free, the inertia of the vehicle will swing the axle and left-hand wheel around to the right on the right-hand wheel as a pivot. Inasmuch as the lever will upon the clutching of one of the brakes move relatively to the vehicle-body, turning with the axle and the shaft K, its position will indicate to the operator the position of the steering-wheel. If it is desired to continue to travel in the new direction, the handle L is released, whereupon the spring P pulls down the shaft K and clamps the clutch M, attached to plate C, to the ring-swivel D, which holds the axle in fixed position. The handle L follows the movement of the axle and indicates at any time the position of the axle.

It will be seen that the real work of steering with the apparatus above described is done by the propelling force of the vehicle, while the operator by a comparatively slight pressure gives the direction. It will also be seen that the axle is normally held in fixed position, thereby reducing the liability of uneven motion by reason of the wheels striking obstacles in the roadway. It will also be observed that the change of the plane of rotation of the wheels is effected instantaneously, whereby the vehicle may be steered with great facility.

In the drawings, referring to Figs. 4, 5, and 6, X represents a suitable bell-crank lever carried by the operator's handle and connected by a rod W to a locking-piece V, mounted in a suitable bearing at the end of the operator's handle. The rod U passes through a suitable support in the operator's handle and is adapted to be clamped by the locking-piece V. When not locked, it is free to move through the handle. At the lower end of the rod U is carried a toggle-joint T T, the ends of the links T T being pivoted to the levers S S, which are pivoted on the shaft K and to which are connected the rods I I. Z is a suitable supporting-bracket fastened to the shaft K and serving as a guide for the rod U. In operation when it is desired to check the speed of the vehicle the bell-crank lever X is pressed toward the lever L, which pulls upon rod W and clamps the clamping-piece V against the rod U, which firmly locks the latter to the end of the operating-lever. The lever L is then pressed downward, which draws rod U upward and forces the ends of the links T T outward, which applies the brakes E E, already described.

It will be understood, of course, that the braking device may be used with or without the steering apparatus above described. It will also be understood that although the above description mentions a vehicle in which the two steering-wheels are mounted upon a single axle the invention is not limited to such construction, as the wheels may be mounted upon broken or relatively movable axes, and I have therefore used the terms "swiveled" and "pivoted" in this specification and the appended claims as applied to such wheels as broad terms to include all such or equivalent constructions for changing the planes of rotation of the wheels.

It will be further understood that the apparatus above described is capable of various modifications without departing from the spirit of the invention, and I therefore desire it to be understood that I do not herein limit myself to the specific constructions shown.

Having thus described my invention, I declare that what I claim as new, and desire to secure by Letters Patent, is—

1. The combination with a vehicle-body, of two independently-rotatable dependent steering-wheels upon which said body is mounted, an operating-lever movable with respect to said body, and means controlled by said lever for checking the rotation of either of said wheels without interfering with the rotation of the other wheel, substantially as described.

2. The combination with a vehicle-body, of two independently-rotatable dependent steering-wheels upon which said body is mounted, an operating-lever movable with respect to said body, and means controlled by said lever for clutching one of said wheels whereby the free rotation thereof will be prevented without interfering with the rotation of the other wheel, substantially as described.

3. The combination with a vehicle-body, of two independently-rotatable dependent steering-wheels upon which said body is mounted, an operating-lever movable with respect to said body, means controlled by said lever for checking the rotation of either of said wheels without interfering with the rotation of the other wheel, and means for maintaining the wheels in the plane to which they have been turned, substantially as described.

4. In a steering apparatus, the combination of two independently-rotatable steering-wheels mounted upon a pivoted axis, means for checking the rotation of either of said wheels without interfering with the rotation of the other wheel, and means for securing said axis in a determined position upon its pivot, substantially as described.

5. In a steering apparatus, the combination of two independently-rotatable steering-wheels mounted upon a pivoted axis, means for clutching either of said wheels whereby the free rotation thereof will be prevented without interfering with the rotation of the other wheel, and means for securing said axis in a determined position upon its pivot, substantially as described.

6. In a steering apparatus, the combination of two independently-rotatable steering-wheels mounted upon a pivoted axis, a clutch connected with each of said wheels, an operating-lever, connections between said lever and said clutches whereby said clutches may be operated by said lever, means for preventing said axis from turning upon its pivot, and connections between said means and said lever, substantially as described.

7. In a steering apparatus, the combination of two independently-rotatable steering-wheels, mounted upon a pivoted axis, a pivoted operating-lever adapted to swing in two or more planes, a clutch connected with each of said wheels, means for preventing said axis from turning upon its pivot, and connections respectively between said clutches and said means and the operating-lever, whereby when the lever is moved in one plane either of said clutches will be operated and when moved in the other plane the other of said means will be operated, substantially as described.

8. In a steering apparatus, the combination of two independently-rotatable steering-wheels mounted upon a pivoted axis, a clutch connected with each of said wheels, an operating-lever adapted to move in two or more planes, connecting-levers between said clutches and said operating-lever whereby either of said clutches may be operated by moving the lever in one of said planes, a clutch adapted to lock the axis upon its pivot, and connections between said clutch and said lever whereby said clutch may be operated by moving the lever in a different plane substantially as described.

9. In a steering apparatus, the combination of two independently-rotatable steering-wheels, means for checking the rotation of either of said wheels whereby the plane of rotation thereof will be changed, means for maintaining the wheels in the plane to which they have been turned, a pivoted operating-lever adapted to move in opposite directions in either of two planes, and connections respectively between said operating-lever and said checking means and maintaining means, whereby as the lever is moved in a given direction in one of said planes the checking means may be operated upon either or both of said wheels and said means for maintaining the wheels in the plane to which they have been turned may also be operated, substantially as described.

10. In a steering apparatus, the combination of two independently-rotatable steering-wheels, mounted upon a pivoted axis, a clutch connected with each of said wheels, an operating-lever adapted to swing in horizontal and vertical planes, levers connecting said clutches with said operating-levers whereby either of said clutches may be operated as the lever is moved in the horizontal plane, a clutch connected with the pivoted axis, a lever connecting said clutch with said operating-lever, whereby the clutch may be operated when the lever is moved in that direction in the vertical plane, levers connected with the first-named clutches, and means whereby said last-named levers may be locked and operated by moving the operating-lever in the other vertical direction, substantially as described.

11. In a steering apparatus, the combination of two independently-rotatable dependent steering-wheels, a brake for each of said wheels, and means for applying either of said brakes independently of the other, or both simultaneously, substantially as described.

12. In a steering apparatus, the combination of two independently-rotatable, dependent steering-wheels, a brake for each of said wheels, an operating-lever, and connections between said lever and said brakes whereby when moved in one direction in one plane said lever will apply one of said brakes, and when moved in the opposite direction in the same plane will apply the other brake, and when moved in a different plane will apply both of said brakes, substantially as described.

13. In a steering apparatus, the combination of two independently-rotatable dependent steering-wheels, a brake for each of said wheels, an operating-lever and connections between said lever and said brakes whereby movement of the lever may be applied to either of said brakes independently of the other or both simultaneously, substantially as described.

14. In a steering apparatus, the combination of two independently-rotatable dependent steering-wheels, a brake for each of said wheels, means for applying either of said brakes independently of the other, or both simultaneously, and means for securing said wheels in a determined plane of rotation, substantially as described.

15. In a steering apparatus, the combination of two independently-rotatable dependent steering-wheels, a brake for each of said wheels, means for securing said wheels in a determined plane of rotation, an operating-lever and connections between said lever and said brakes and securing means, whereby either may be operated independently of the other, or all simultaneously, substantially as described.

16. The combination with a vehicle-body, of three or more wheels supporting the same, two of which wheels are dependent steering-wheels pivoted upon said body and means for applying friction to either of said steering-wheels independently of the other, whereby the momentum of the vehicle will change the plane of rotation of said wheels with respect to the body, substantially as described.

17. The combination with a vehicle-body, of a pair of swiveled steering-wheels, means for applying friction to either of said wheels independently of the other, whereby the momentum of the vehicle will change the plane of rotation of said wheels, and means for securing said wheels in a determined plane of rotation, substantially as described.

18. The combination with a vehicle-body, of three or more wheels supporting the same, two of which wheels are dependent steering-wheels pivoted upon said body and means for applying friction to either of said steering-wheels independently of the other whereby the momentum of the vehicle will change the planes of rotation of said wheels with respect to the body, or to both of said wheels simultaneously to brake the same, substantially as described.

19. The combination with a vehicle-body, of a pair of dependent steering-wheels the planes of rotation of which are movable relatively to said body, an operating-lever also movable relatively to said body and moving simultaneously with a change in said planes of rotation, means for applying friction to either of said wheels independently of the other, and connections between said last-named means and said operating-lever, substantially as described.

In testimony whereof I affix my signature in presence of two witnesses.

EMIL LUNDQVIST.

Witnesses:
HENRY HASPER,
WOLDEMAR HAUPT.